…

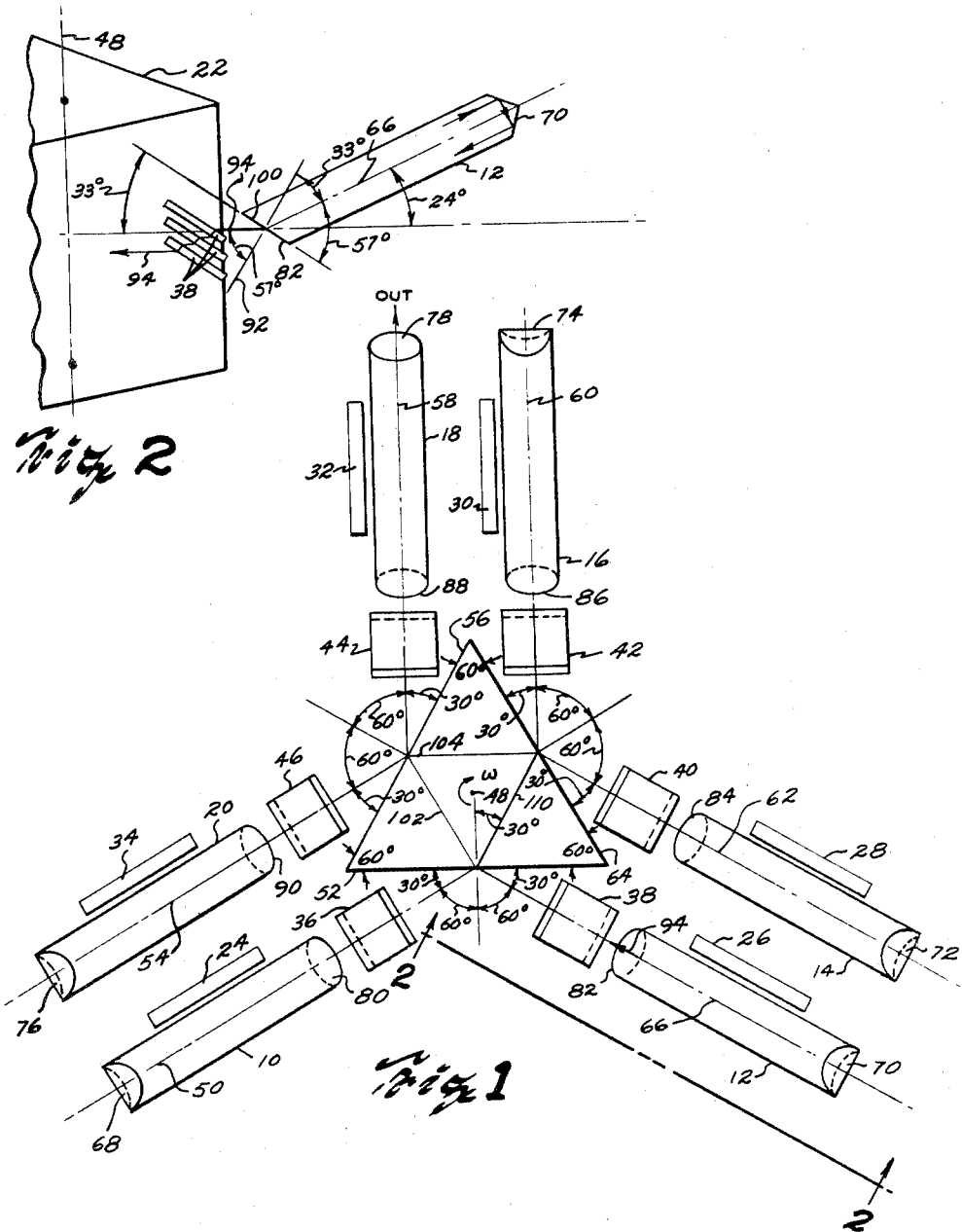

United States Patent Office 3,416,097
Patented Dec. 10, 1968

3,416,097
Q-SWITCHED LASER SYSTEM
George R. Simpson, South Woodstock, Conn., assignor to American Optical Company, Southbridge, Mass., a corporation of Delaware
Filed Aug. 27, 1964, Ser. No. 392,520
5 Claims. (Cl. 331—94.5)

ABSTRACT OF THE DISCLOSURE

A laser system comprised of a multiplicity of elongated laser components, means for pumping the components to an inverted energy state and means for intermittently coupling the components in optically interconnected series relationship with each other as a single resonant cavity with simultaneous Q-switching at each occurrence of coupling.

---

This invention relates generally to lasers, and particularly to a simple means for mechanically Q-switching a laser device in an efficient manner. More specifically, the invention relates to resonant laser structures wherein the ratio of wave energy storage to wave energy dissipation per wave energy cycle (Q) is shiftable from a low value to a high value at a predetermined finite time after the laser material in the structure has been energized to establish a laserable inversion of energy states thereof.

Lasers (an acronym for "light amplification by the stimulated emission of radiation"), sometimes referred to as optical masers, are light-amplifying devices and are specifically adapted to produce high intensity pulses of coherent, monochromatic light concentrated in an extremely narrow beam. They find use in diverse fields as sources of light energy; being employed to deliver light energy in intense and highly concentrated form to a relatively small target area.

Light is produced in a laser by photonic emission from the active atoms of a body composed of a so-called laser material. This emission occurs incident to the transition of the atoms from an excited higher energy level to a lower energy level. Accordingly, laser operation essentially involves exciting active atoms in the laser body to such higher energy level, and inducing the emissive transition of the excited atoms in a manner controlled to utilize the light thereby emitted to provide the desired laser output pulse. The nature and number of inter-level transitions which must be affected in a complete atomic cycle of laser operation are dependent upon the properties of the particular laser material used.

By way of example, one conventional form of laser structure includes a rod-shaped body composed of a suitable solid laser material, such as synthetic crystalline ruby or an organic or inorganic glass having an activator ion, surrounded concentrically by a helical gaseous discharge tube (commonly called a flash tube), which is adapted to emit a pulse of light specifically including light in the wavelength of an absorption band of the laser material. When the flash tube is activated, the light generated thereby enters the transmissive laser rod, "pumping" the body with energy of such wavelength. This pumping excites active atoms in the laser body to shift from an initial low energy level in a series of inter-level transitions, typically involving a first energy-absorptive transition to a very unstable high energy level, and an immediately subsequent spontaneous transition (with release of heat and not light energy, but presently regarded as non-emissive) from this unstable level to the somewhat more stable high energy level intermediate in energy between the aforementioned initial and unstable levels, and from which light-emissive transition occurs. Thus, the pumping pulse from the flash tube provides the excitation step in laser operation, creating a very large population of atoms at the higher energy level in the laser body. The establishment of this large high level population is referred to as an inversion of energy states of the body and once established, the laser body is considered to be in a negative temperature distribution state.

For affecting induced light-emissive transition from the intermediate level to complete the atomic cycle of laser operation, the laser body of the structure is usually disposed coaxially within a resonant cavity defined between opposed internally reflective cavity ends. Immediately upon the inversion of energy states of the body to a negative temperature distribution, individual atoms at the intermediate energy level begin to undergo emissive transitions spontaneously, shifting to a terminal low energy level (which may or may not be the initial low energy level, depending upon the nature of the laser material) with concomitant emission of light. Since this intermediate level is relatively stable, compared to the high energy level in a laser material, such spontaneous emissions would deplete the enlarged higher level population at a comparatively slow rate. However, a portion of the light emitted by the spontaneously emitting atoms passes through the resonant cavity to the ends thereof, and is then reflected back and forth between the ends, passing and re-passing in multiple bidirectional reflections. This bidirectionally reflected light excites other atoms at the intermediate energy level in such a manner as to induce them to undergo emissive transition to the terminal level, producing more light, which augments the bidirectionally reflected light, to induce still further emissive transitions from the intermediate energy level. In this way, a rising pulse of bidirectionally reflected light quickly develops within the cavity, reaching a quantitatively large value as the induced emissive transitions of atoms from the intermediate level become massive. Light of high intensity is, accordingly, created in one or a succession of light pulses while the pumping light is present, the action continuing until depletion of the intermediate level population by such transitions restores the laser body to a normal energy state. To permit emission of a portion of the large bidirectionally reflected light pulse or pulses from the laser cavity, one reflective end of the cavity is made partially transmissive. The fraction of the bidirectionally reflected light escaping therethrough constitutes the laser output.

In laser operation as described above, the energy pumping pulse is of finite duration and excitation of atoms to the higher energy levels occurs throughout this finite period. However, with a laser cavity maintained internally reflective at both ends, light emitted by spontaneous emission from atoms in the high level population begins to reflect back and forth in the cavity and, in so doing, induces emissive transitions of other high level atoms in significant number at a so-called threshold point, which is reached before the end of the pumping period. Thus, for a considerable portion of the pumping period, the effect of the pumping pulse in augmenting the higher level population is offset by the depletion of that population due to induced transitions, with the result that the magnitude of the higher level population states levels off prematurely at a plateau.

Therefore, the same pumping pulse could create a significantly larger maximum high level population in the laser body if the transition inducement created by multiple light reflections could be retarded until a later time in the pumping period. Such delay of the latter state would be desirable because the magnitude of the peak power attained by the laser output pulse is directly related to the magnitude of this maximum higher level population; and it is often regarded as very desirable to obtain as large a peak power output as possible for optimum laser utility. In other words, the prevention of premature bidirectional light reflections, thereby allowing development of a larger higher level population, would enable attainment of peak power output greater than that produced with the above-described laser operation.

It has been found that the multiple bidirectional reflections of spontaneously emitted light can be delayed in the desired manner by a technique referred to as "Q-switching." The Q, or quality factor, of the laser resonant cavity is proportional to the ratio of wave energy storage to wave energy dissipation per cycle therein. When one end of the cavity-providing structure is non-reflective, the resultant structure is said to be in a low Q condition, because light emitted by the spontaneous transitions of higher level atoms in the laser body cannot reflect back and forth to augment the higher level population, but is instead dissipated at the non-reflective end after a maximum of two passes through the structure. The Q-switching operation involves maintaining the cavity-providing structure in a low Q condition during that portion of the pumping pulse required for the high level population to reach a maximum value (which is substantially larger than the plateau value obtained in laser threshold operation as described above). Then, at a time approximating the moment of maximum inversion, if a previously non-reflective end of the cavity structure is caused to become reflective, the laser is switched to a so-called high Q condition. Multiple bidirectional reflection of light produced by spontaneous emission in the laser body begins immediately upon such switching, and quickly rises by induced emission from atoms in the very large higher level populations previously established. The resultant laser output pulse is much faster in rise time, and greater in peak power than the pulse produced in threshold laser operation.

It has also been found that if the emission in the laser operation can be enhanced by providing a plane polarized output, the power per unit area delivered by the laser at any given distance (an inverse function of the beam spread angle) will be advantageously increased. Thus, to the extent that bidirectionally reflected light emitted in spurious planes of polarization is inhibited, the emissive efficiency of the laser is desirably improved. It has been found that polarization selection can be effected in a laser structure of the type described by maintaining the cavity in low Q condition for light emitting in other directions of polarization throughout laser operation, and providing a high Q condition primarily restricted to the selected plane of polarization, thereby providing a laser output pulse of superior intensity and a narrow beam spread.

Techniques for increasing intensity in a narrow beam spread have heretofore involved the increase of the laser rod cross-sectional area. However, such techniques so increase the propagation of spurious modes that the inverted atoms are significantly de-populated, thereby preventing the total contribution of all inverted atoms to the total energy output. Also, the center portion of the rod is insufficiently pumped when an increased cross-sectional area is used.

An alternate technique for increasing energy output and limiting beam spread is to restrict the output aperture and increase the length of the laser rod. However, this latter technique is more difficult to deal with from the point of view of space considerations. Also, some solid laser materials are difficult to fabricate in long lengths.

Accordingly, a primary object of the present invention is to provide a new and improved laser system, which improves laser operation and increases the output power of lasers.

A further more specific object is to provide an improved laser system for producing an output light pulse of advantageously superior peak power per unit area.

A still further object is to provide in a Q-switched laser, means for the attainment of a high degree of inversion before the laser device switches to a high Q condition to obtain an output of significantly greater intensity than has heretofore been known, and to affect stimulation of that output predominantly by selected plane wave light energy.

Another object is to provide a laser system and device with Q-switching features provided in a novel and advantageous combination to produce output pulses of superior peak intensity.

Still another object is to provide a new and improved laser structure wherein Q-switching features are provided to produce output light pulses of fast face rise time and duration.

These and other objects are accomplished in one illustrative embodiment of the invention wherein a multiplicity of laser rods are so grouped with respect to a rotating prism coupler for the rods that they may all be pumped to an inverted energy state during the time it takes for said prism coupler to be rotated from one coupling position to the next. The rods are reflective at one end only so that a low Q condition is maintained until the prism achieves a position to couple the multiplicity of laser rods thereby establishing resonant cavities and instantaneously switching the aggregate laser device to a high Q condition. A means is provided at the exit ends of the laser rods to provide a substantially plane polarized input to the coupling prism. The chosen direction of polarization achieves coupling with other laser rods by simultaneous selective reflection and refraction at the multiple faces of the prism, thereby simulating one long laser rod.

Further objects and advantages of the invention will be apparent from the detailed description hereinafter set forth, together with the accompanying drawings, wherein:

FIG. 1 is a top view diagrammatic representation of a laser system utilizing principles of the present invention; and, FIG. 2 is a side view representation of one of the lasers of FIG. 1, shown together with its associated polarizing or Brewster angle plates and the rotable prism, which provides the Q-switching feature of the invention.

Referring first to FIG. 1, the structure of the invention in the embodiment there illustrated includes first, second, third, fourth, fifth and sixth lasers 10, 12, 14, 16, 18, and 20, disposed symmetrically about prism 22 having an equilateral triangular cross-section. Each laser is associated with a flash tube 24, 26, 28, 30, 32 and 34, respectively, and a stack of Brewster angle plates 36, 38, 40, 42, 44 and 46, respectively, disposed between the output end of the laser and the aforementioned prism. Prism 22 is rotably mounted about axis 48, in order to provide the Q-switching capability to be discussed in more detail below. The specific arrangement of the laser rods is such that a pair of rods 20 and 10 are disposed in a parallel relationship, so that they are also parallel to a plane (perpendicular to the plane of the paper in the drawing of FIG. 1) from the axis 48 through a point of the triangular cross-section of the prism 24, when the prism is in Q-switching position. Likewise, pairs 12–14 and 16–18 are so arranged with the other two points of the triangle. In this way, the axis of the laser rod when projected to the prism, intersects the prism face at a point equidistant from the edges thereof and makes an angle of 30 degrees with said face. Therefore, the axis 50 of rod 10 intersects face 52 of the prism at an angle of 60 degrees with the normal to that prism face. Similarly, the axis 54 of rod 20 intersects face 56 of the prism and makes an angle of 60 degrees with the normal to that face, as does the axis 58 of rod 18. Also the axes 60 and 62 of rods 14 and 16, respectively, intersect the center of face 64 of the prism and each make an angle of 60 degrees with the normal to that face. The axis 66 of rod 12 is in the same way with that of rod 10 to make an angle of 60 degrees with the normal to face 52 of the prism. Each laser rod is provided, at its end which is furtherest from the prism, with a substantially totally reflecting roof having a 90 degrees angle. Roofs 68, 70, 72, 74 and 76 are respectively on rods 10, 12, 14, 16 and 20 at their ends remote from prism 22, while rod 18, which is not so provided with a roof, has a Brewster angle face 78 disposed at the end of that rod which is furthest from the prism 22. Similarly, all rods, including rod 18, have at their ends, which are closest to the prism 22, Brewster angle faces 80, 82, 84, 86, 88 and 90, respectively. The Brewster angle faces are each at an angle of approximately 57 degrees to the respective axes of the rods in a plane normal to the plane of the paper in the drawing of FIG. 1 and the Brewster angle plates 36, 38, 40, 42, 44 and 46 are arranged at the same angle with the same respective rod axes. Each of the plates and the laser are composed of a barium potassium silicate glass (commonly referred to as a very light barium crown glass) with an index of refraction of approximately 1.54. Thus the Brewster angle for this material is 57 degrees. The prism 22 is composed of a material having an index of refraction of 1.732 (very dense flint glass), so that the output of each laser rod along its axis will strike the face of the prism at a Brewster angle (the tangent of which is equal to the index of refraction, 1.732, of the prism). Thus, the Brewster angle for this material is 60 degrees.

FIG. 2 is a side view of the laser rod 12 and its associated Brewster angle plates 38, which clearly shows the roof end 70 and the end nearest the prism 82 being at a Brewster angle to the axis of the rod 66. The rod is disposed at an angle of 24 degrees from the horizontal, so that the output of the laser rod is at an angle of 57 degrees with the normal 92 to the Brewster angle face 82 of the laser rod 12. The output 94 of the laser rod is therefore oriented horizontally and after traversing the Brewster angle plates 38 remains horizontal at its intersection with the prism 22.

Preliminary to the description of the operation of a laser system according to the present invention, it is necessary that certain basic optical relationships be completely understood. For instance, the plane of incidence passes through the normal to the plane to which a particular ray is incident and the incident ray. Also, the proportion of Fresnel reflection is equal to the tangent of the angle of incidence minus the angle of refraction divided by the tangent of the angle of incidence plus the angle of refraction, all squared, $$\left(\text{Percent intensity, parallel polarization} = \frac{\tan^2(\sphericalangle i - \sphericalangle r)}{\tan^2(\sphericalangle i + \sphericalangle r)}\right)$$

for the polarization vectors of a ray which are parallel to the above-defined plane of incidence. For the polarization vectors of rays which are perpendicular to the plane of incidence, the proportion of Fresnely reflection is equal to the sine of the angle of incidence minus the angle of refraction divided by the sine of the angle of incidence plus the angle of refraction, all squared $$\left(T \text{ intensity, perpendicular polarization} = \frac{\sin^2(\sphericalangle i - \sphericalangle r)}{\sin^2(\sphericalangle i + \sphericalangle r)}\right)$$

Therefore, it may be seen, with reference to FIG. 2, that rays propagated along axis 66 of laser rod 12 whose polarization vectors are parallel to the plane of incidence when exiting at the Brewster level 100 of the laser rod, will have a zero loss by Fresnel reflection. It is also seen that the polarization vectors of the exiting rays which are perpendicular to the plane of incidence at the Brewster level 100 will have approximately 16.5 percent of their intensity reflected. Since the Brewster plates 38 are of the same material as the laser rod and therefore at the same Brewster angle, the parallel polarization vectors will be refracted only in passing to prism 22. However, those vectors polarized perpendicular to the plane of incidence lose approximately 35% of their intensity as they pass through three or more Brewster plates 38. It should be understood at this point that it is not sufficient to simply multiply the aforementioned 16.5% loss by the number of Brewster plates in order to obtain the total loss by Fresnel reflection, since reflection also occurs at the back side of the Brewster plates and therefore contributes somewhat to propagation of such vectors rather than detracting from the transmission.

It was previously stated that the Brewster angle for the prism 22 is 60 degrees, which is precisely the angle between the normal to the prism face and any particular laser output line of propagation at the instant when prism 22 is in the position shown in FIG. 2. It may be seen from FIG. 1 that the plane of incidence, which goes through both the normal to a prism face and the propagated laser output paths, is oriented perpendicular to the plane of incidence previously alluded to with reference to the Brewster plates and levels at the exit ends of the various laser rods. Therefore, the polarization vectors which were previously stated as being parallel to the plane of incidence, when referring to a plane of incidence for the Brewster plates and levels at the exit ends of the laser rods, will now be referred to as perpendicular to the plane of incidence, when considering the plane of incidence for the prism 22. It is then seen that polarization vectors parallel to the plane of incidence of the prism (previously referred to as perpendicular polarization) will propagate unreflected through the prism face. It is also seen that polarization vectors perpendicular to the plane of incidence of the prism (previously referred to as parallel polarization) will be mostly refracted, but somewhat reflected at the prism surface.

The foregoing analysis substantiates the well-known proposition that when the angle of incidence plus the angle of refraction equals 90 degrees (which it will at Brewster angle), the reflection of vectors polarized parallel to the plane of incidence will be substantially zero; and only vibrations perpendicular to the plane of incidence are somewhat reflected. Accordingly, the output along ray axis 94 of laser 12, shown in FIG. 2, will propagate with its parallel polarized vectors intact as it passes through the Brewster plates 38. These parallel vectors will then be partially reflected at the prism surface 52 and partially refracted. The refracted portion will propagate along line 102 (see FIG. 1) to prism surface 56 where it will be further reflected along line 104 and further refracted along the axis 58 of laser rod 18. The reflected portion at face 52 will, of course, propagate along the axis 50 of laser 10 and the portion reflected along line 104 will be further refracted at face 64 of the prism along axis 62 of the laser rod 14. Likewise, the output of laser 10 will be propagated through the prism to lasers 16 and 20 and be reflected from prism face 52 to laser 12. Also, the output of laser 20 will be reflected from prism face 56 to laser 18 and be refracted through the prism to lasers 14 and 10; the output of laser 18 will be reflected to laser 20 and be refracted through the prism to lasers 12 and 16; the output of laser 16 will be reflected to laser 14 and be refracted to lasers 10 and 18; the output of laser 14 will be reflected to laser 16 and refracted through the prism to lasers 20 and 12. The foregoing couplings are illustrative only of the coupling that is possible between the six laser rods with reference to their outputs whose vectors are polarized perpendicular to the plane of incidence of the prism 22. Other couplings are possible with vectors of that polarization and an example of such other couplings may be illustrated by the fact that the output rays of laser 20, which are polarized perpendicular to the plane of incidence of the prism are refracted along line 104 and then reflected along line 110 and further reflected along line 102 to the axis 58 of the laser 18.

Thus, this system has a triangular symmetry which causes the radiation from any rod to enter and be collinear with other rods when the prism is in the position shown in FIG. 1. Therefore, the roof ends of lasers 10 and 12 from a Fabry-Perot type cavity for the polarization perpendicular to the plane of incidence via the Fresnel reflection from prism face 52. The roof of rod 10 also cooperates with the roof of rod 16 to form a Fabry-Perot type cavity via refraction of the vectors polarized both perpendicular and parallel to the plane of incidence through face 52 along line 110 and further refracted at face 64 along line 60, which is the axis of rod 16. Further Fabry-Perot type cavities are formed to eventually extend the active length of all laser rods in the system without the severe space problem caused by the use of one long rod. Couplings are thereby established mutually between all of those rods and at the exit the roof is replaced by a Brewster angle level on rod 18 to provide a radiation exit aperture for all six rods.

Inherent in the foregoing description is the fact that, the mode with vectors polarized parallel to the plane of incidence of the prism (previously perpendicular to the plane of incidence of the rod) is propagated without reflection through the prism. However, the Q or ratio of energy stored to energy dissipated per energy cycle is lower than for the other direction of vibration, since there are great reflection loses at the exit ends of the rods and at the Brewster plates which are adjacent those rods. Since the mode with vectors polarized parallel to the plane of incidence of the prism is never reflected, the 65% (approximately), which is incident to the prism, is coupled only to one other rod and therefore within the Fabry-Perot cavity formed between roof ends of those two rods, it will oscillate and depopulate the inverted ions and be eventually absorbed in the material of the laser rods. These oscillations however will be infrequent, since a sufficient number of Brewster plates will so reflect that mode of vibration.

The technique for Q-switching the system involves the rotation of the prism about axis 48 at a high angular velocity ω. No Fabry-Perot cavity exists in the configuration unless the prism is so oriented that a line normal to the prism facet bisects the angle between rod pairs. Therefore if the prism is rotating and the rod pumping commences just after the prism has come through the coupling orientation, the rods may be pumped for the time it takes the prism to rotate 120°, at which time the Fabry-Perot cavities are reestablished. Thus, the laser energy may be stored for a time equal to three times the angular velocity ω divided by two times π, prior to establishing the high Q condition and obtaining laser action. It is also possible with a configuration according to the present invention to vary the distance between the laser rods and the rotating prism to adjust the Q-switching time. The greater the distance, the shorter will be the switching time for any given angular velocity.

It may be noticed that such couplings as the one between the output of laser rod 10 and laser rod 12 by reflection from surface 52 of the prism will cause a change in phase between the laser light incident to the prism surface and the reflected light from that surface. However the change in phase is irrelevant to the present invention, since it is the frequency of light that is most important in stimulating the transition downward from a higher energy level to a lower energy level in the laser device and the output phase will automatically lock in to the phase of the laser component with the dominant output. As long as the frequency similarily is maintained between the various laser rods which are coupled, intensity magnification will be accomplished by the system shhown in FIG. 1. Therefore, by the avoidance of resonance when the prism is not aligned as shown, emissive transitions of higher level atoms in significant number will be delayed and the magnitude of the higher level population will be able to reach a peak value much higher than that possible in presently available laser devices. This peak of population will be instantaneously deplated when the prism is correctly aligned to couple the laser rods, since resonant cavities will be immediately formed. At the instant of coupling, a giant burst of laser output energy will be formed and subsequently emitted at the output end of laser rod 18.

It should also be understood that calcite crystals or "Polaroid" plates can be substituted for the Brewster angle plates to affect polarization selection in alternative embodiments of this invention.

I claim:

1. A Q-switched laser system comprising; a multiplicity of elongated laser components each having an active laser ingredient therein; means for energizing said ingredients to establish a laserable inversion of energy states thereof; means for intermittently coupling said laser components in optically interconnected series relationship with each other as a single Q-switched resonant laser cavity, said coupling means including a prism having a continuous succession of peripherally disposed flat faces, said prism being rotatable about a central axis extending parallel to said faces, said laser components being all fixedly disposed with their respective axes lying in a plane perpendicular to said faces and each directed right-angularly toward one of said faces at one rotational position of said prism and thereafter at each successive angular increment of rotation equaling one revolution of the prism (360°) divided by the number of said faces, the ends of all said components adjacent said prism and the opposite end of one of said components being terminated at Brewster angles, the opposite ends of all remaining components being internally reflective to light and means for rotating said prism whereby said coupling of said components with Q-switching is effected at said one and successive increments of rotational positioning of said prism and said laserable inversion of energy states is effected during periods of prism rotation between occurrences of said positioning.

2. A Q-switched laser system according to claim 1 wherein said coupling means further includes light polarizing means between the prism and the adjacent end of each of said components.

3. A Q-switched laser system according to claim 2 wherein said light polarizing means comprises a number of Brewster angle plates.

4. A Q-switched laser system according to claim 1 wherein a plurality of said laser components are directed right angularly toward each one of said faces of said prism at occurrences of said one and increments of rotational positioning of said prism.

5. A Q-switched laser system according to claim 4 wherein said prism is of an equilateral triangular configuration and said succession of faces is three in number, said multiplicity of laser components is six in number and said components are arranged in parallel pairs in said plane, respective components of each pair being disposed axially parallel to a line extending from the geometrical center of said prism through an edge of the prism between two adjoining faces thereof and each component of each pair being spaced the same distance from said line.

References Cited

UNITED STATES PATENTS

| 3,242,439 | 3/1966 | Rigden et al. | 331—94.5 |
| 3,310,753 | 3/1967 | Burkhalter | 331—94.5 |
| 3,315,177 | 4/1967 | Benson | 331—94.5 |
| 3,292,102 | 12/1966 | Byrne | 331—94.5 |

JEWELL H. PEDERSEN, *Primary Examiner.*

B. J. LACOMIS, *Assistant Examiner.*